(12) United States Patent
Winter et al.

(10) Patent No.: US 12,128,922 B2
(45) Date of Patent: Oct. 29, 2024

(54) USER INTERFACE TECHNIQUES FOR RECOMMENDING REMOTE ASSISTANCE ACTIONS

(71) Applicant: Waymo LLC, Mountain View, CA (US)

(72) Inventors: Collin Winter, San Francisco, CA (US); Vishay Nihalani, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 373 days.

(21) Appl. No.: 17/558,062

(22) Filed: Dec. 21, 2021

(65) Prior Publication Data

US 2023/0192129 A1    Jun. 22, 2023

(51) Int. Cl.
*B60W 60/00* (2020.01)
*G01C 21/34* (2006.01)
(Continued)

(52) U.S. Cl.
CPC .... *B60W 60/0011* (2020.02); *B60W 60/0027* (2020.02); *G01C 21/3461* (2013.01);
(Continued)

(58) Field of Classification Search
CPC ... B60W 60/0011; G06T 11/001; G05D 1/001
(Continued)

(56) References Cited

U.S. PATENT DOCUMENTS 8,412,449 B2    4/2013  Trepagnier
8,577,538 B2    11/2013  Lenser
(Continued)

FOREIGN PATENT DOCUMENTS

| | | |
|---|---|---|
| CN | 112606820 A | 4/2021 |
| EP | 3299921 A1 | 9/2017 |
| EP | 3822946 A1 | 5/2021 |

OTHER PUBLICATIONS

Graf, "Combining direct and indirect control for teleoperated autonomous vehicle", CHI'19 Workshop on "Loking into the Future: Weaving the Threads of Vehicle Automation", Glasgow, UK (2019).
(Continued)

*Primary Examiner* — Todd Melton
*Assistant Examiner* — Vincent Feng
(74) *Attorney, Agent, or Firm* — McDonnell Boehnen Hulbert & Berghoff LLP

(57) ABSTRACT

Example embodiments relate to user interface techniques for recommending remote assistance actions. A remote computing device may display a representation of the forward path for an autonomous vehicle based on sensor data received from the vehicle. The computing device may augment the representation of the forward path to further depict one or more proposed trajectories available for the autonomous vehicle to perform. Each proposed trajectory conveys one or more maneuvers positioned relative to road boundaries in the forward path. The computing device may receive a selection of a proposed trajectory from the one or more proposed trajectories available for the autonomous vehicle to perform and provide navigation instructions to the vehicle based on the proposed trajectory.

20 Claims, 11 Drawing Sheets

(51) Int. Cl.
*G06F 3/04842* (2022.01)
*G06T 11/00* (2006.01)

(52) U.S. Cl.
CPC ...... *G06T 11/001* (2013.01); *B60W 2420/403* (2013.01); *B60W 2554/801* (2020.02); *B60W 2554/802* (2020.02); *B60W 2556/45* (2020.02); *G06F 3/04842* (2013.01); *G06T 2200/24* (2013.01)

(58) Field of Classification Search
USPC .......................................................... 701/24
See application file for complete search history.

(56) References Cited

U.S. PATENT DOCUMENTS

| | | | |
|---|---|---|---|
| 8,660,734 | B2 | 2/2014 | Zhu |
| 9,008,890 | B1* | 4/2015 | Herbach ................ G01C 21/34 340/436 |
| 9,216,737 | B1 | 12/2015 | Zhu |
| 9,465,388 | B1 | 10/2016 | Fairfield |
| 9,494,935 | B2 | 11/2016 | Okumura |
| 9,933,779 | B2 | 4/2018 | Ross |
| 10,078,964 | B2 | 9/2018 | Li |
| 10,459,440 | B2 | 10/2019 | Rust |
| 10,705,539 | B2 | 7/2020 | Pedersen |
| 10,712,750 | B2 | 7/2020 | Kentley-Klay |
| 10,955,848 | B2 | 3/2021 | Dyer |
| 2017/0075348 | A1 | 3/2017 | Kratz |
| 2017/0248964 | A1* | 8/2017 | Kentley .................. G01S 15/86 |
| 2019/0011910 | A1* | 1/2019 | Lockwood ............. G08G 1/164 |
| 2020/0198619 | A1 | 6/2020 | Glenn |
| 2020/0409368 | A1 | 12/2020 | Caldwell |
| 2021/0080943 | A1 | 3/2021 | Iwamoto |
| 2021/0114617 | A1* | 4/2021 | Phillips ............. B60W 30/0956 |
| 2021/0149389 | A1 | 5/2021 | Weslosky |
| 2023/0159027 | A1* | 5/2023 | Pronovost ......... B60W 60/0027 701/26 |

OTHER PUBLICATIONS

Cameron, "Introducing VoyageTelessist", Introducing Voyage Telessist, https://news.voyage.auto/introducing-voyage-telessist-a085e4c1f691, retrieved Sep. 21, 2021.

* cited by examiner

USER INTERFACE TECHNIQUES FOR RECOMMENDING REMOTE ASSISTANCE ACTIONS

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving. Some situations, however, can arise during navigation that may impact a vehicle's ability to navigate toward a destination.

SUMMARY

Example embodiments described herein relate to user interface techniques for recommending remote assistance actions. Such techniques can help guide human operators when providing different forms of assistance to autonomous and semi-autonomous vehicles.

In one aspect, an example method is provided. The method involves receiving, at a computing device, sensor data depicting a forward path for an autonomous vehicle. The computing device is positioned remotely from the autonomous vehicle. The method also involves displaying, by the computing device, a representation of the forward path based on the sensor data and augmenting the representation of the forward path to further depict one or more proposed trajectories available for the autonomous vehicle to perform. Each proposed trajectory conveys one or more maneuvers positioned relative to road boundaries in the forward path. The method involves receiving, at the computing device, a selection of a proposed trajectory from the one or more proposed trajectories available for the autonomous vehicle to perform, and providing, by the computing device and to the autonomous vehicle, navigation instructions based on the proposed trajectory.

In another aspect, an example system is provided. The system includes an autonomous vehicle and a computing device positioned at a remote location relative to the vehicle. The computing device is configured to receive sensor data depicting a forward path for an autonomous vehicle, display a representation of the forward path based on the sensor data, and augment the representation of the forward path to further depict one or more proposed trajectories available for the autonomous vehicle to perform. Each proposed trajectory conveys one or more maneuvers positioned relative to road boundaries in the forward path. The computing device is further configured to receive a selection of a proposed trajectory from the one or more proposed trajectories available for the autonomous vehicle to perform, and provide, to the autonomous vehicle, navigation instructions based on the proposed trajectory.

In yet another example, an example non-transitory computer readable medium having stored therein program instructions executable by a computing system comprising one or more processors to cause the computing system to perform operations is provided. The operations include receiving sensor data depicting a forward path for an autonomous vehicle, displaying a representation of the forward path based on the sensor data, and augmenting the representation of the forward path to further depict one or more proposed trajectories available for the autonomous vehicle to perform. Each proposed trajectory conveys one or more maneuvers positioned relative to road boundaries in the forward path. The operations also include receiving a selection of a proposed trajectory from the one or more proposed trajectories available for the autonomous vehicle to perform and providing, to the autonomous vehicle, navigation instructions based on the proposed trajectory.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
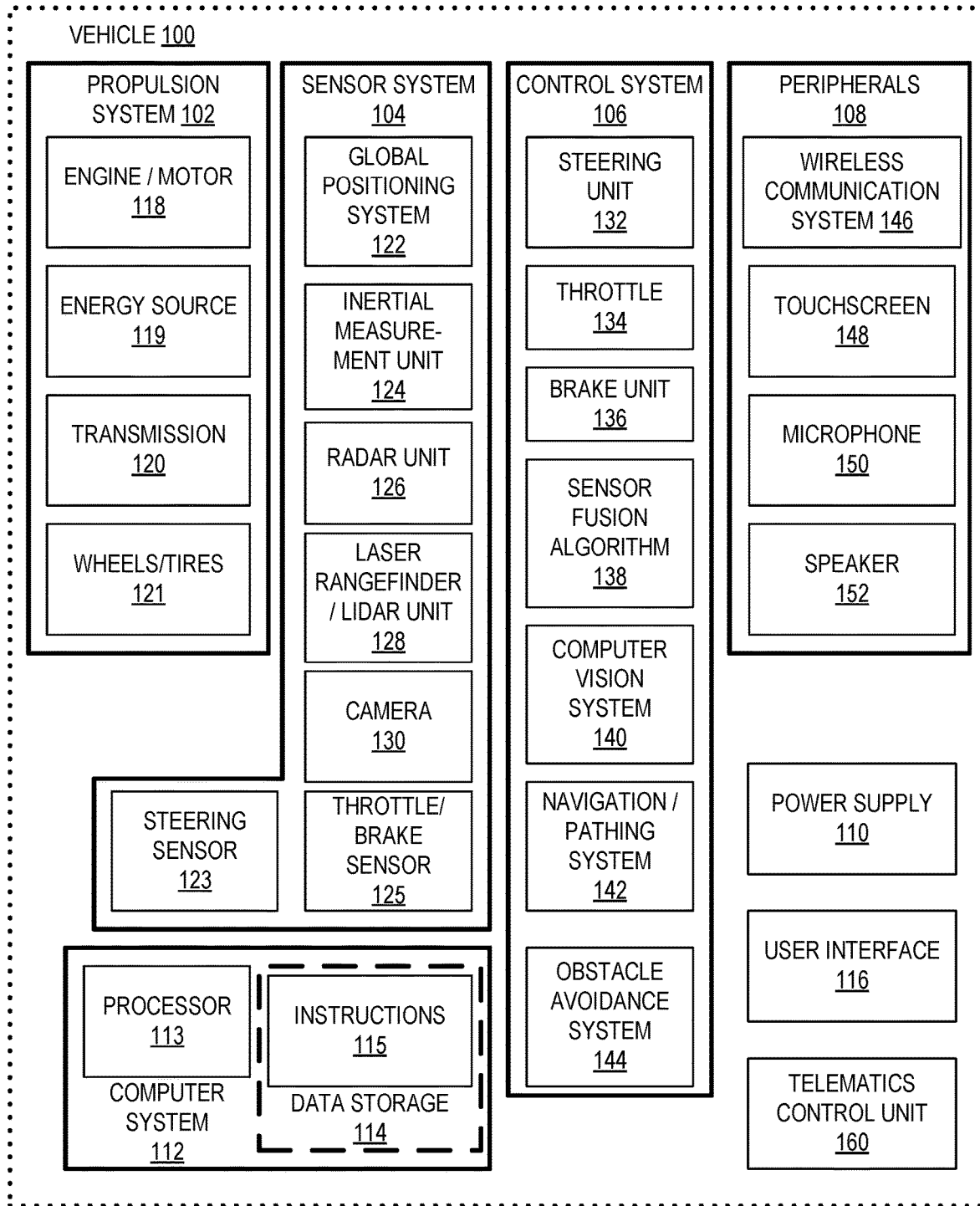
FIG. 1 is a functional block diagram illustrating a vehicle, according to example implementations.
Figure 2A:
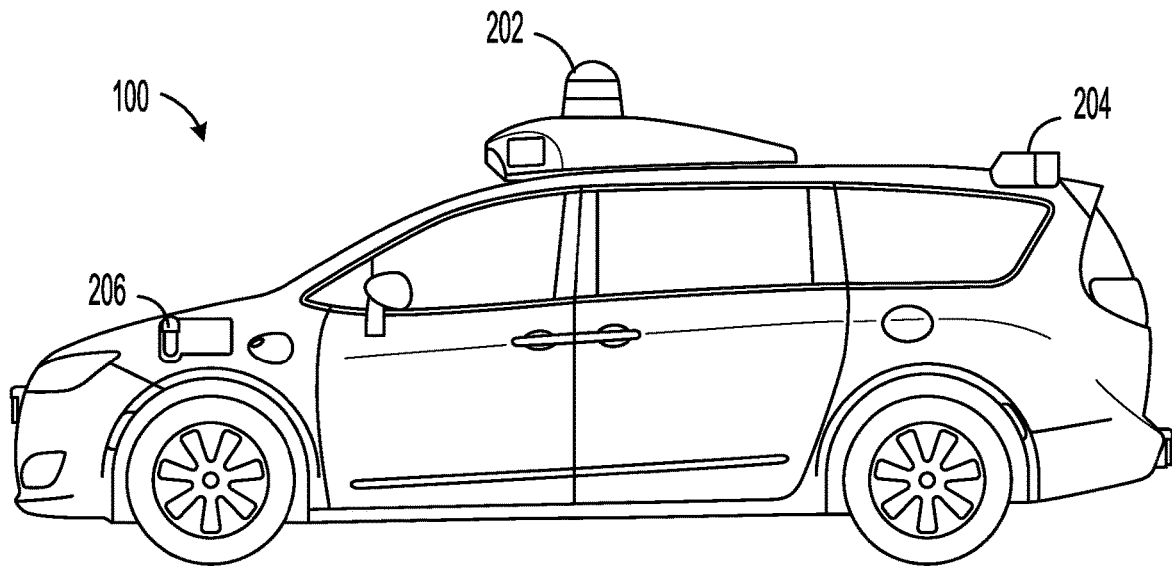
FIG. 2A illustrates a side view of a vehicle, according to one or more example embodiments.
Figure 2B:
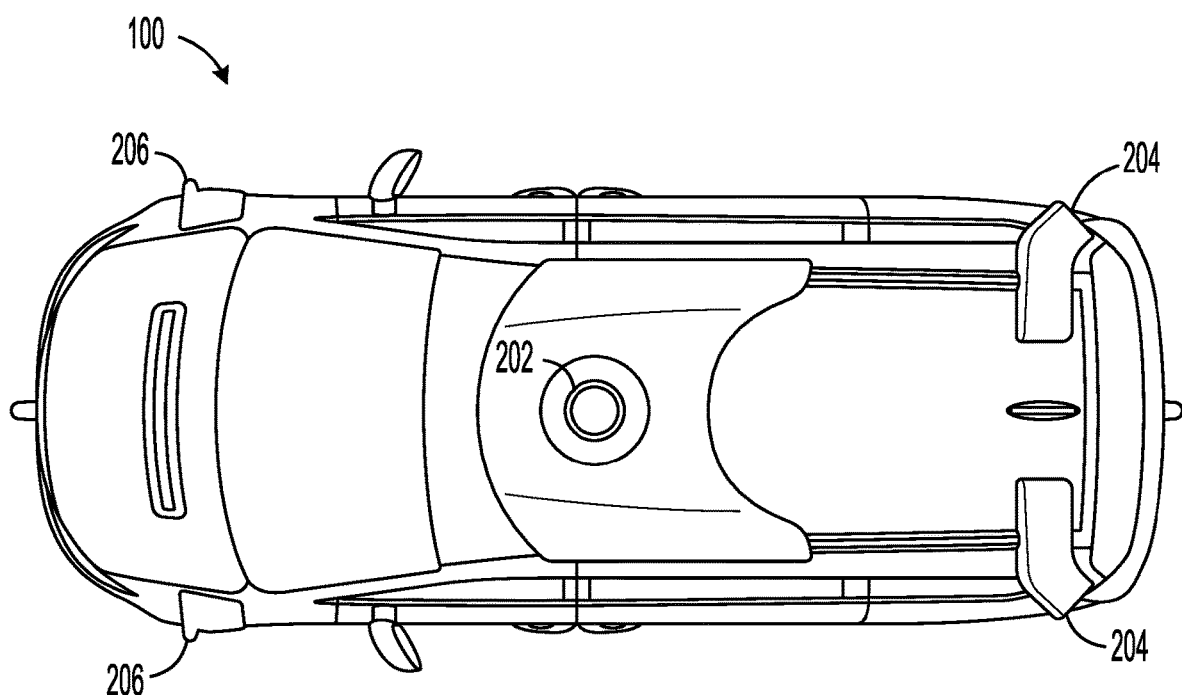
FIG. 2B illustrates a top view of a vehicle, according to one or more example embodiments.
Figure 2C:
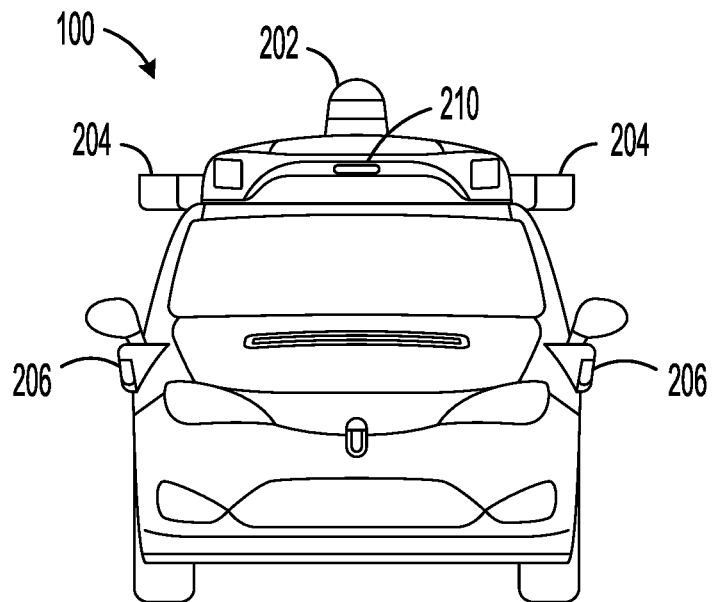
FIG. 2C illustrates a front view of a vehicle, according to one or more example embodiments.
Figure 2D:
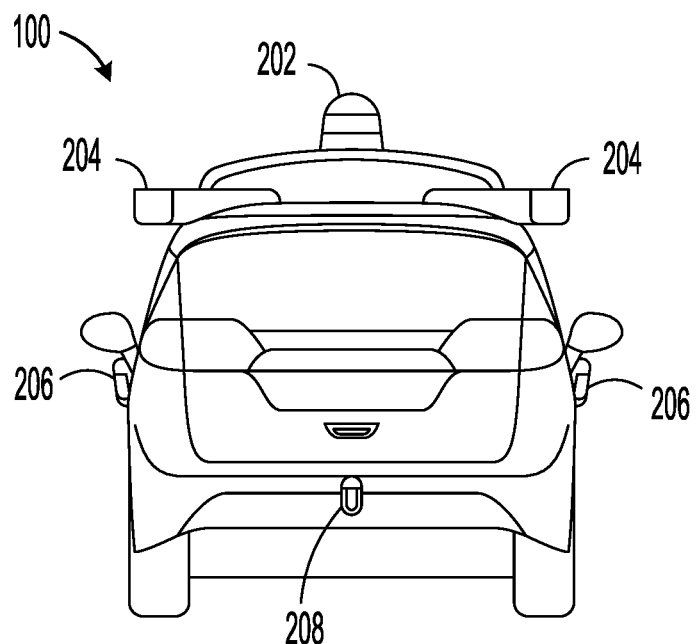
FIG. 2D illustrates a back view of a vehicle, according to one or more example embodiments.
Figure 2E:
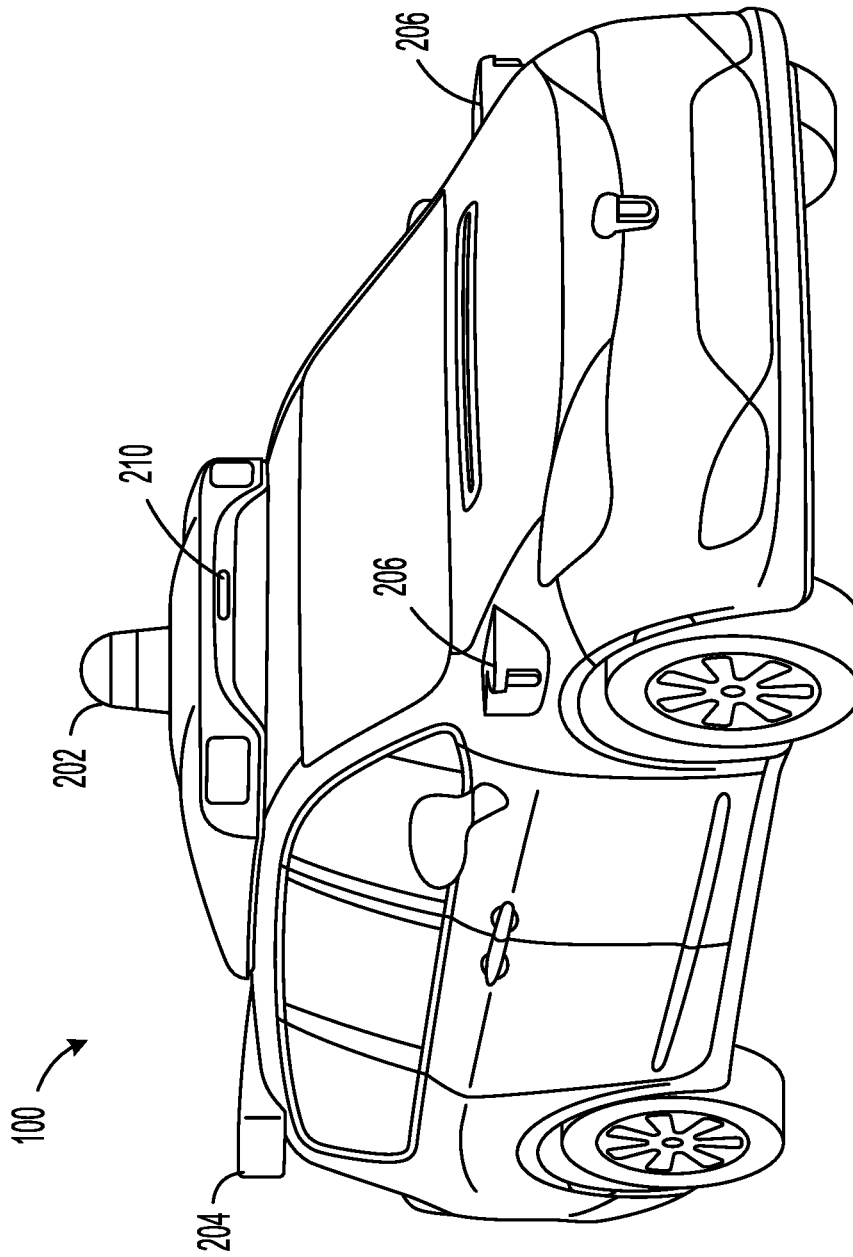
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As a vehicle navigates to a destination in an autonomous or semi-autonomous mode, the vehicle may encounter some situations that can interfere and potentially block its current trajectory. For instance, construction sites, poorly marked roadways, stranded vehicles, or obstructed views of signs or pathways can alter and sometimes limit a vehicle's ability to navigate its surrounding environment. In situations where vehicle systems fail to independently overcome obstacles encountered during navigation, remote assistance offers a solution that can help guide the vehicle through the situation. For instance, a vehicle may request assistance from a remote human operator, who can then provide route instructions that the vehicle can use to overcome an obstacle. In some cases, a remote operator can already be monitoring the navigation of a vehicle and provide assistance when the vehicle encounters a potential obstacle that requires assistance.

Example embodiments presented herein describe user interface techniques for recommending remote assistance actions, which can enable human operators to assist vehicles in a timely manner. By recommending remote assistance actions based on a vehicle's situation, a human operator may be guided by a computing device when trying to understand and provide assistance that can resolve the situation for the vehicle. For instance, the computing device used by a human operator can be configured to use vehicle context to identify and display a particular graphical user interface (GUI) template from available templates, limit and recommend specific selectable options, provide specific instructions, and/or perform other operations that can help accelerate the delivery of assistance to vehicles. As an example result, the human operator may be able to assist more vehicles by using the guidance provided based on the context of the vehicle's situation.

By way of an example, a computing device may receive sensor data depicting a forward path for an autonomous vehicle and subsequently display a representation of the forward path based on the sensor data. The sensor data can convey information about the surrounding environment, such as the position, heading, and velocities of nearby vehicles and other objects as well as boundary information. The computing device can display the representation of the vehicle's environment using the incoming sensor data received from the vehicle.

In some embodiments, the computing device is positioned remotely from the vehicle and used by a human operator to assist the vehicle. Through a wireless connection between the computing device and the vehicle, the human operator can monitor navigation of the vehicle to provide assistance when needed or can receive a request for assistance from the vehicle that initiates the communication session between the computing device and the vehicle. In other implementations, the computing device can be a personal computing device of a passenger, such as a smartphone or a wearable device.

The computing device can be configured to augment the representation of the vehicle's forward path to further depict one or more proposed trajectories available for the autonomous vehicle to perform. Each proposed trajectory may convey one or more maneuvers positioned relative to road boundaries in the forward path. Road boundaries can be based on the roads in the areas, nearby curbs, lane markers, traffic cones, painted markers, and/or other elements that serve to guide vehicles during navigation. The computing device may further receive a selection of a proposed trajectory from the one or more proposed trajectories available for the autonomous vehicle to perform and provide, by the computing device and to the autonomous vehicle, navigation instructions based on the proposed trajectory.

In some examples, the computing device initially receives a request for assistance from a vehicle operating in an autonomous mode or a semi-autonomous mode. The request for assistance may include location information and the sensor data from one or more vehicle sensors on the autonomous vehicle, such as cameras, radar, sonor, and/or lidar. For instance, the computing device may use a wireless communication connection to receive images (video) in near real-time from the vehicle, which can enable a human operator to view the vehicle's forward path and surrounding environment from the vehicle's perspective. In some examples, the computing device may convey a position of the vehicle relative to its surroundings from a bird eye's perspective based on sensor data obtained from the vehicle.

In addition, the computing device can receive predictive analytics from the vehicle, such as behavior predictions for objects near the vehicle. The behavior predictions can indicate trajectories that the vehicle systems predict that each object is likely to perform. In some cases, the behavior predictions can indicate a confidence level that an object will perform a trajectory, such as a percentage likelihood. For instance, a first behavior prediction assigned to a nearby vehicle may indicate that vehicle systems predict that the vehicle will continue its current navigation at the same velocity and heading with a first confidence level (e.g., a 90 percent likelihood) and a second behavior prediction assigned to another nearby vehicle may specify a maneuver that vehicle systems predict the vehicle to perform at a second confidence level (e.g., a 40 percent likelihood).

The computing device can augment the representation of the vehicle's forward path to further convey the predictive analytics received from the vehicle. This way, a human operator may be able to review, modify, suppress, and/or perform other actions related to the different behavior predictions associated with objects in the surrounding environment. For example, the computing device may display visual paths for objects based on behavior predictions associated with the objects. The computing device can also display confidence levels for the different behavior predictions associated with objects in the environment. As an example result, the computing device may receive modifications for one or multiple behavior predictions and update the proposed trajectories displayed via the GUI.

In some examples, the computing device can modify proposed trajectories for a vehicle to perform after receiving operator input that modified one or multiple behavior predictions for objects. The computing device can then display the modified proposed trajectories for the human operator to further review and select from.

In addition, user interface techniques may use colors and/or other visual cues to help convey contextual information to a human operator. For instance, the computing device can depict proposed trajectories available for the vehicle to perform in different colors according to a color scale. The color scale can represent differences in confidence levels associated with the proposed trajectories.

In some examples, a computing device can recommend a navigation strategy for review by a remote operator. The navigation strategy can be based on the geographic location and environment of the vehicle. For instance, the computing device may use past successful trajectories based on other vehicles navigation in the location to recommend a navigation strategy for the human operator to approve, reject, and/or modify. The computing device may use prior successes by the vehicle in that location, other vehicles, and/or vehicles driven by human drivers.

In some examples, the computing device may use a map comparison technique to detect obstacles. The obstacle detection can be used to recommend a navigation strategy for review by a human operator. The navigation strategy can be used by a vehicle operating in an autonomous or semi-autonomous mode. The map comparison may involve comparing an expected map of the location of a vehicle and sensor data depicting objects at the location from the perspective of the vehicle. The results of the map comparison can enable the computing device to identify differences, which may include objects or other obstacles that are causing an issue for the vehicle that is requesting assistance. As such, the computing device may recommend a trajectory or trajectories for review by a human operator. The human operator can select a trajectory to provide assistance to the vehicle.

Example techniques can allow for a remote operator to provide assistance to a vehicle with less latency, which can allow the vehicle to receive and execute operations based on the assistance before the vehicle even comes to a stop in some instances. In addition, these techniques can be useful for autonomous trucking and/or in specific situations, such as marking waypoints that adhere to different lane layouts that can arise within construction zones or other dynamic environments. In some embodiments, remote assistance may involve establishing a secure communication connection between a human operator and one or more vehicle systems or passengers traveling within a vehicle. The human operator may receive sensor data depicting the environment in near real-time and provide assistance to the vehicle (or passengers) immediately.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in enabling navigation by vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100.

User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
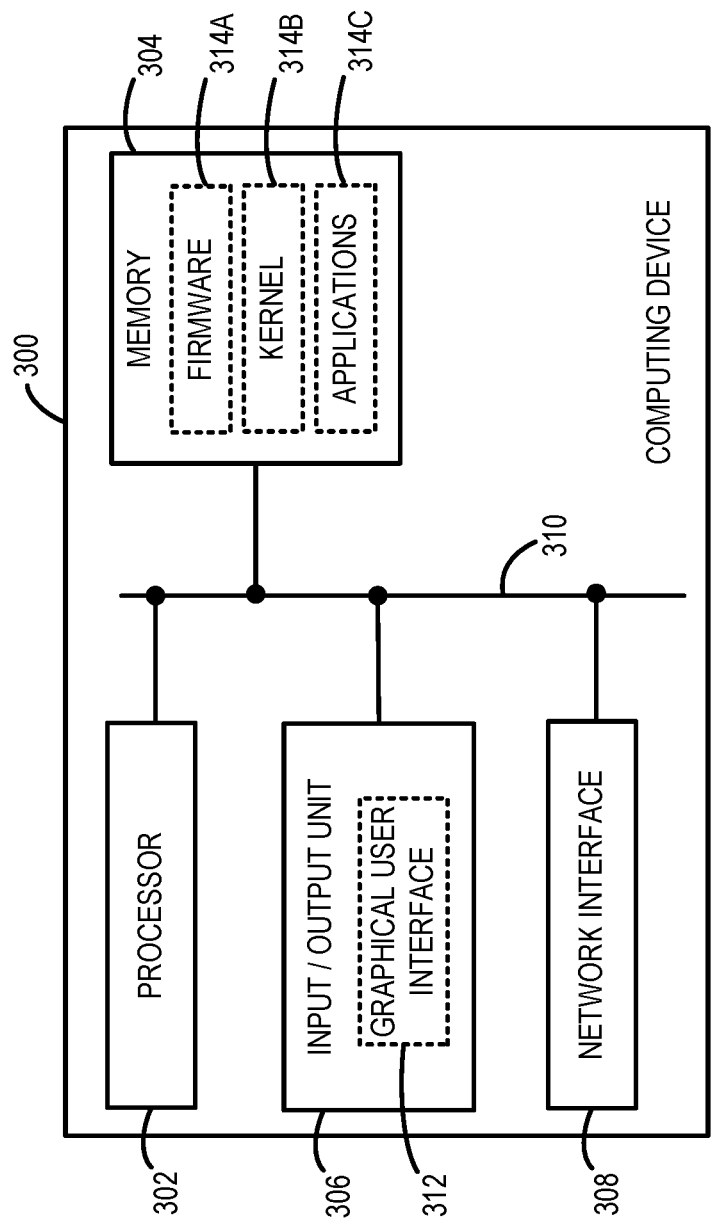
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism.

In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
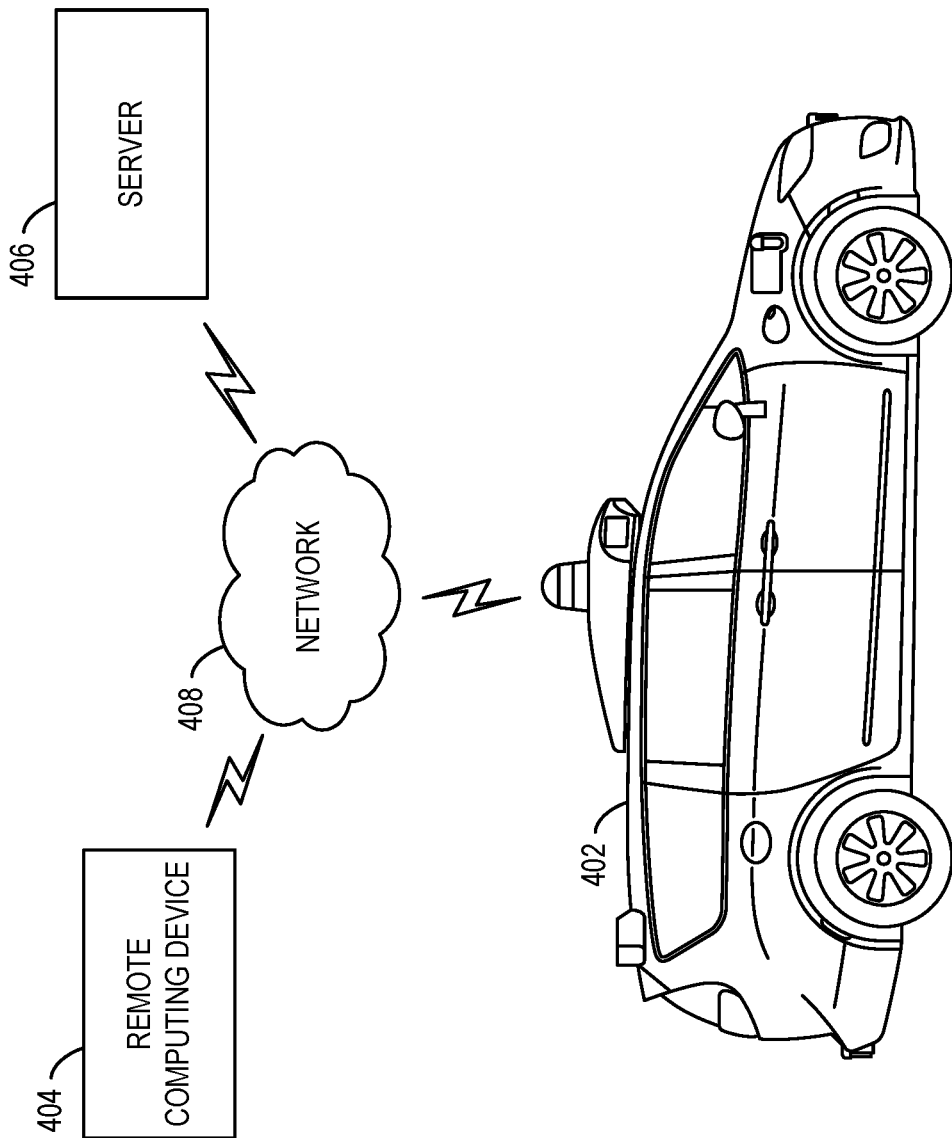
FIG. 4 is a system for wireless communication between computing devices and a vehicle, according to one or more example embodiments.

FIG. 4 is a system for wireless communication between computing devices and a vehicle, according to one or more example embodiments. System 400 may enable vehicles (e.g., vehicle 402) to obtain remote assistance from human operators using computing devices positioned remotely from the vehicles (e.g., remote computing device 404). Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may transport passengers or objects between locations, and may take the form of any one or more of the vehicles discussed above, including passenger vehicles, cargo shipping vehicles, farming and manufacturing vehicles, and dual-purpose vehicles. When operating in an autonomous mode (or semi-autonomous mode), vehicle 402 may navigate to pick up and drop off passengers (or cargo) between desired destinations. In some embodiments, vehicle 402 can operate as part of a fleet of vehicles, such as within a fleet of ride-share vehicles.

Remote computing device 404 may represent any type of device related to enabling remote assistance techniques, including but not limited to those described herein. Within examples, remote computing device 404 may represent any type of device configured to (i) receive information related to vehicle 402, (ii) provide an interface (e.g., a GUI, physical input interfaces) through which a human operator can in turn perceive the information and input a response related to the information, and (iii) transmit the response to vehicle 402 or to other devices (e.g., storage at server 406). As such, remote computing device 404 may take various forms, such as a workstation, a desktop computer, a laptop, a tablet, a mobile phone (e.g., a smart phone), a wearable device (e.g., a headset) and/or a server. In some examples, remote computing device 404 may include multiple computing devices operating together in a network configuration. In further embodiments, remote computing device 404 may resemble a vehicle simulation center with the remote operator positioned as the drive of the simulation center. In addition, remote computing device 404 may operate as a head mountable device that can simulate the perspective of vehicle 402.

The position of remote computing device 404 relative to vehicle 402 can vary within examples. For instance, remote computing device 404 may have a remote position from vehicle 402, such as operating inside a physical building. In another example, remote computing device 404 may be physically separate from vehicle 402, but operate inside vehicle 402 to enable a passenger of vehicle 402 to act as the human operator. For instance, remote computing device 404 can be a touchscreen device accessible to a passenger of vehicle 402. Operations described herein that are performed by remote computing device 404 may be additionally or alternatively performed by vehicle 402 (i.e., by any system(s) or subsystem(s) of vehicle 100). In other words, vehicle 402 may be configured to provide a remote assistance mechanism with which a driver or passenger of the vehicle can interact.

Operations described herein can be performed by any of the components communicating via network 408. For instance, remote computing device 404 may determine remote assist options for a human operator to review based on different levels of information provided by vehicle 402. In some embodiments, vehicle 402 may determine potential navigation options for remote computing device 404 to display for a remote operator to review. Potential options could include routes, vehicle movements, and other navigation parameters for review by remote computing device 404 and/or a remote operator using remote computing device 404.

In other embodiments, remote computing device 404 may analyze sensor data or other information from vehicle 402 to determine the situation and potential options for a remote operator to review. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. As such, server 406 may be configured to perform any operation(s), or portions of such operation(s), that is/are described herein as performed by remote computing system 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network.

In some embodiments, remote assistance for vehicles can originate from a network of remote operators. For example, a vehicle may submit a request for assistance that is received at an entry point of the network. The entry point may connect the request with a remote operator that can provide assistance. The remote operator may be selected based on credentials associated with the remote operator that indicate that she or he is able to handle the type of assistance that is being requested and/or the operator's availability, among other potential parameters. The entry point may analyze information within the request to route requests for assistance accordingly. For example, the network of remote operators may be used to provide assistance to an entire fleet of autonomous vehicles.

Figure 5:
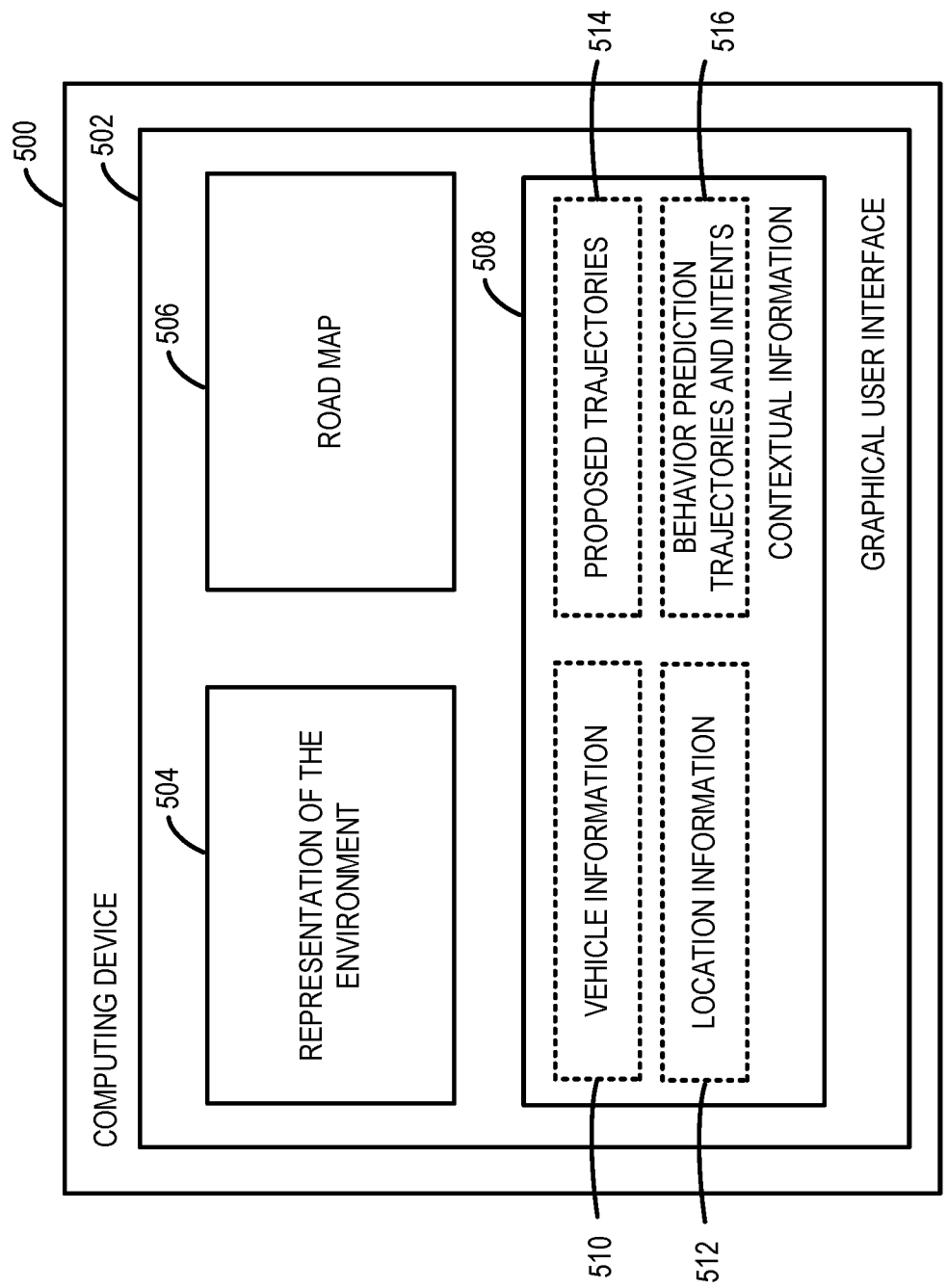
FIG. 5 illustrates a computing device displaying a graphical user interface for enabling remote assistance, according to one or more example embodiments.

FIG. 5 illustrates computing device 500 displaying GUI 502 for enabling delivery of remote assistance to a vehicle, according to one or more example embodiments. Computing device 500 can be implemented as computing device 300 shown in FIG. 3 and may enable wireless communication between human operators and vehicles.

In some cases, computing device 500 may receive a request for assistance from a vehicle that encountered a difficult situation and subsequently alert a human operator to provide assistance via various alert techniques, such as visual, audio, and/or tactile alerts. In other cases, a vehicle and computing device 500 may establish a wireless communication connection prior to the vehicle requiring assistance to resolve a situation. For instance, an operator may be tasked with monitoring vehicles through a particular situation (e.g., a construction site) and computing device 500 may automatically establish a connection with a vehicle in advance after detecting that the vehicle is approaching the situation. In some examples, computing device 500 may be used to enable a human operator to monitor a fleet of vehicles. For instance, a central system may route requests for assistance to available operators. In another example, the routing system can be a decentralized system that is supported via various nodes, such as computing device 500.

In addition, computing device 500 may perform remote assist techniques in some examples, which can involve providing assistance to overcome various situations. For instance, computing device 500 may represent a powerful computing system that can perform simulations to check potential outcomes based on navigation information provided by a vehicle. As an example, a vehicle may provide video data and one or multiple proposed trajectories for the vehicle to perform, which can be analyzed and/or simulated by computing device 500 to generate an output. The output may indicate which trajectory the vehicle should perform in some instances. The computing device 500 may also notify a human operator when the output indicates that none of the proposed trajectories satisfy a success threshold. In some examples, computing device 500 can also generate proposed trajectories for a vehicle to perform based on sensor data representing the environment. For instance, computing device 500 can use sensor data from the vehicle to simulate different maneuvers until a particular trajectory satisfies a success threshold. In some cases, computing device 500 may submit a request for a human operator to review and approve the generated trajectory prior to sending the trajectory to the vehicle for subsequent performance.

In the example embodiment, computing device 500 is shown displaying GUI 502, which includes environment representation 504, road map 506, and contextual information 508. These visual elements are shown for illustration purposes and can be combined, further divided, replaced, and/or supplemented by other elements in other examples. For instance, GUI 502 may display only road map 506 in some implementations. In addition, the arrangement of the elements is for illustration purposes and can vary within implementations.

GUI 502 represents a system of interactive visual components for computer software, which can be used to display objects that convey information to a human operator and also represent actions that can be taken by the operator. For instance, computing device 500 may generate GUI 502 based on templates stored in memory and customized to a vehicle's given situation, which can enable an available remote operator to review and provide assistance. In some cases, GUI 502 can allow the remote operator to provide remote assistance that can be used to generate augmented route instructions that navigate vehicles with respect to an encountered obstacle or series of obstacles (e.g., a construction site). Computing device 500 may display GUI 502 on a display interface, such as a touch screen, external monitor, and/or a display interface associated with a head-mounted wearable computing device (e.g., augmented reality).

Computing device 500 may use GUI 502 to enable interaction between a human operator and vehicles. For instance, the human operator may provide inputs to computing device 500 via touch inputs, buttons or hardware inputs, motion, and/or vocal inputs. In some embodiments, computing device 500 may include a microphone that can receive vocal inputs and use speech recognition software to derive operations based on the vocal inputs from the operator. In addition, in some implementations, computing device 500 may resemble a vehicle emulator that can simulate the vehicle's perspective. The various elements (e.g., environment representation 504, road map 506, and contextual information 508) shown in GUI 502 can be customized according to different settings enabled by computing device 500.

Environment representation 504 is an object displayable via GUI 502 that can represent the current environment (or a recent environment) from one or more perspectives, such as the perspective of the vehicle or a simulated bird's-eye view. For instance, environment representation 504 may be images and/or videos captured by vehicle cameras. In other instances, sensor data from different types of sensors can be used to generate environment representation 504 displayed via GUI 502. For instance, environment representation 504 may include data based on a point cloud developed using radar and/or LIDAR. As such, environment representation 504 can be updated in near-real time as the wireless communication between computing device 500 and a vehicle enables more information to be received and displayed.

In some cases, environment representation 504 can show the positions of obstacles or other environment elements in the vehicle's surrounding environment. For example, environment representation 504 may depict other vehicles, pedestrians, bicycles, traffic signals and signs, road barriers, buildings, and/or other features within the vehicle's environment. Computing device 500 may use visual indicators (e.g., arrows, boxes, and colors) to highlight aspects in environment representation 504, such as the obstacles blocking the path of travel of the vehicle. For example, computing device 500 may use computer vision to detect and identify objects in the environment.

Computing device 500 may also display road map 506 via GUI 502 based on a location of the vehicle. Road map 506 may represent one or more maps of roads that depend on the current location and route of the vehicle. For instance, the vehicle may provide GPS measurements or another indication of the vehicle's location within the request for assistance or during subsequent communication between the vehicle and computing device 500. By using the vehicle's location, computing device 500 can acquire road map 506 and further enhance the information included within environment representation 504 and/or other objects displayed via GUI 502. For instance, road map 506 can be augmented to display obstacles detected in vehicle sensor data from the assistance requesting vehicle and/or other vehicles that captured measurements of that area. In some examples, computing device 500 can determine and display environment representation 504 as an elevated view of the vehicle and nearby surroundings estimated based on road map 506 and the sensor data from the vehicle. In some examples, GUI 502 may include both a sensor perspective of the vehicle's environment and the elevated view estimated based on one or both of the sensor data and/or road map 506.

GUI 502 also includes contextual information 508, which may convey additional information about the vehicle's situation. As shown in FIG. 5, contextual information 508 includes vehicle information 510, location information 512, proposed trajectories 514, and behavior predictions 516. Vehicle information 510 may indicate a variety of information about the vehicle, such as the type of vehicle, the vehicle sensors on the vehicle, the quantity of the passengers, and target destination, etc. Location information 522 may represent information based on the current location of the vehicle, such as map data depicting the environment and lanes available for the vehicle to use. Contextual information 508 may also specify information related to the situation, such as how long has the vehicle been stranded and a reason proposed by the vehicle for the stranding.

Proposed trajectories 514 represent different navigation trajectories that vehicle systems may potentially cause a vehicle to perform and may originate from different sources within examples. For instance, computing device 500 may receive one or multiple proposed trajectories 514 from the vehicle that requested assistance. As the vehicle navigates, vehicle systems may use measurements of the surrounding environment to determine and perform a control strategy according to traffic rules and regulations. In some cases, the vehicle systems may fail to identify a trajectory that satisfies a confidence threshold required to perform the trajectory. As an example result, the vehicle may provide information representing proposed trajectories 514 to computing device 500 with a request for assistance, which can allow a human operator to review proposed trajectories 514. In addition, computing device 500 can also filter proposed trajectories received from the vehicle prior to conveying proposed trajectories 514 to a human operator. For instance, computing device 500 can use a filter that removes proposed trajectories based on confidence levels and/or required maneuvers. In some examples, computing device 500 may generate one or more proposed trajectories 514 based on information received from a vehicle.

Behavior predictions 516 include information that represent potential actions by other objects located nearby the vehicle. Vehicle systems may predict the future states of nearby vehicles and other objects based on the current and past observations of the surrounding environment, which can enhance awareness of imminent hazards. As such, computing device 500 may receive behavior predictions 516 from the vehicle in some implementations. Computing device 500 may also generate behavior predictions for an object or objects based on sensor data received from the vehicle.

Computing device 500 may be configured to convey proposed trajectories 514 and behavior predictions 516 via GUI 502. This way, a human operator may have the information available when providing assistance to a vehicle. In some examples, computing device 500 may augment environment representation 504 and/or road map 506 to further convey proposed trajectories 514, behavior predictions 516 or both.

In some examples, computing device 500 may augment environment representation 504 to show visual trajectories for objects based on behavior predictions 516 and a visual trajectory for each proposed trajectory 514. GUI 502 may also display instructions and other information that assists a human operator provide assistance to the vehicle.

Figure 6A:
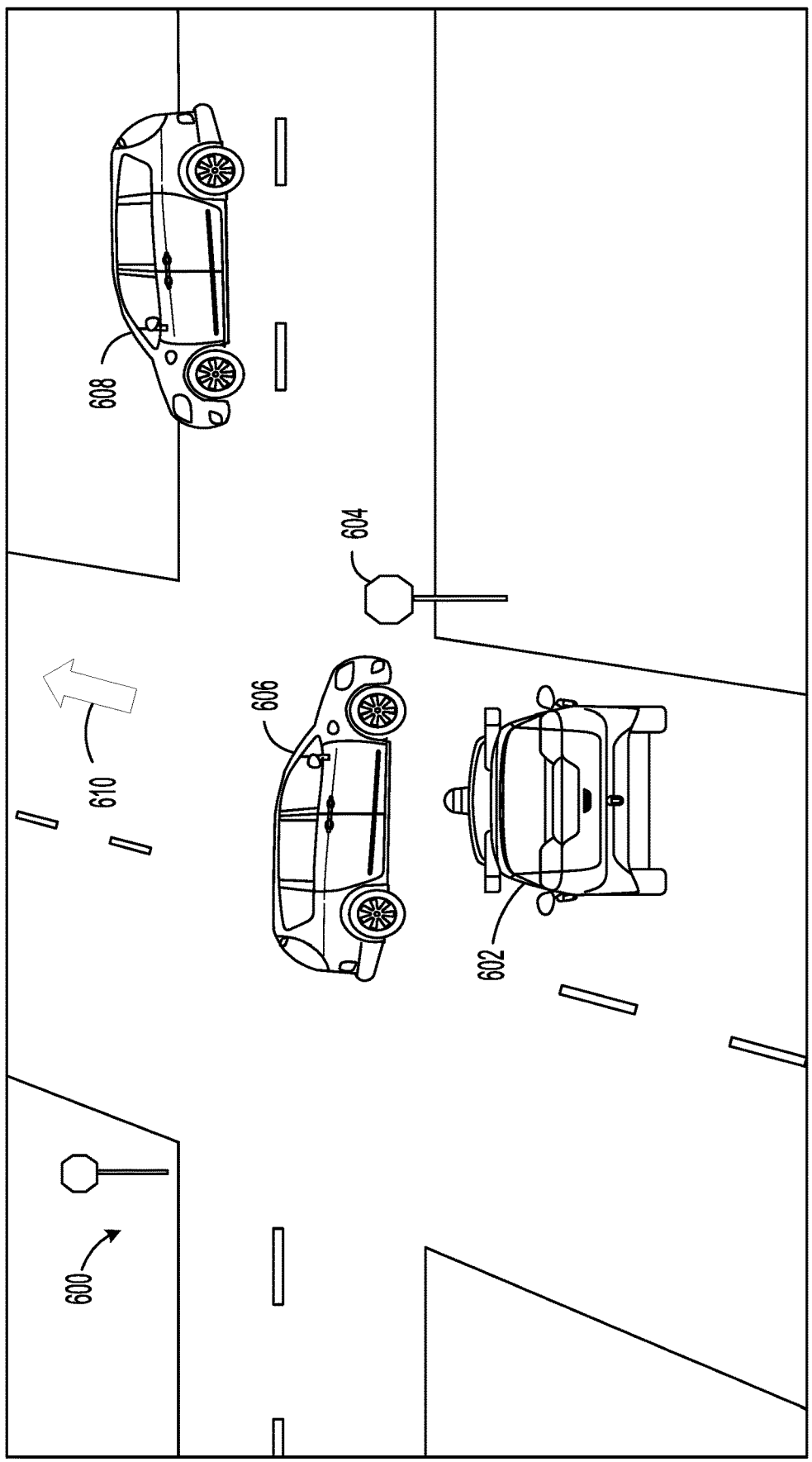
FIG. 6A illustrates a remote assistance situation, according to one or more example embodiments.

FIG. 6A illustrates remote assistance situation 600, which shows vehicle 602 encountering vehicle 606 stranded in the middle of the intersection and in path 610 being navigated by vehicle 602. As such, situation 600 is shown to represent an example scenario where vehicle 602 may use remote assistance to overcome an obstacle (e.g., stranded vehicle 606). Other example scenarios are possible.

In the example embodiment, situation 600 involves stranded vehicle 606 disrupting the current path 610 of vehicle 602. In some cases, vehicle systems may alter path 610 to circumvent stranded vehicle 606 while also obeying traffic regulations (e.g., stopping at stop sign 604) and avoiding vehicle 608. In other cases, vehicle 602 may use remote assistance to obtain navigation instructions that overcomes situation 600. For instance, vehicle 602 may communicate with a remote computing device, such as remote computing device 404 shown in FIG. 4 or computing device 500 shown in FIG. 5.

Figure 6B:
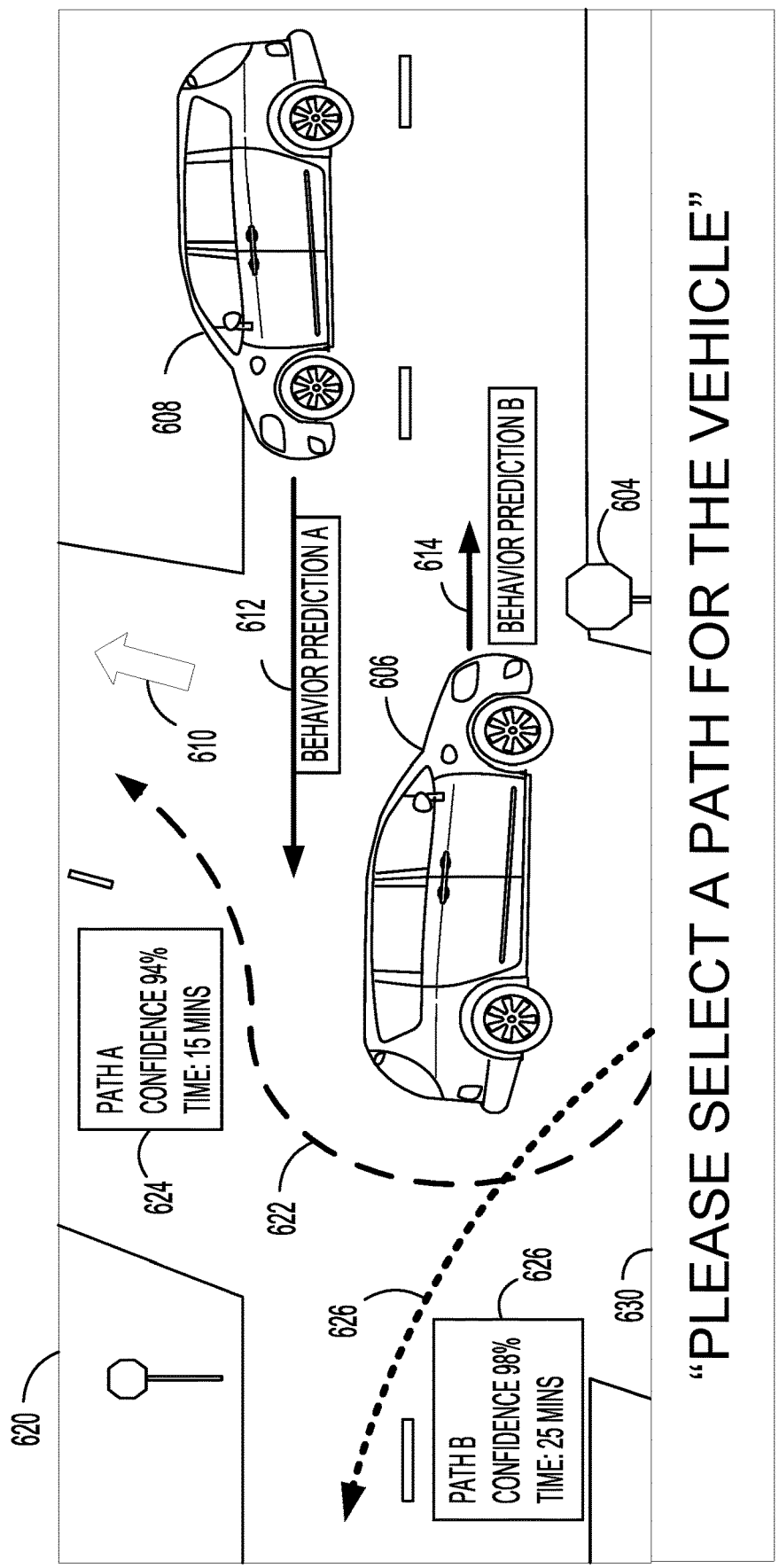
FIG. 6B illustrates a user interface for enabling remote assistance for the remote assistance situation shown in FIG. 6A, according to one or more example embodiments.

FIG. 6B depicts GUI 620 displayable by a computing device to enable remote assist. In the example embodiment, GUI 620 shows the environment of vehicle 602 based on sensor data received from vehicle 602. In particular, GUI 620 may use images and/or video received from vehicle 602 to convey the environment in near real-time, which shows vehicle 606 stranded in the middle of the intersection and in front of vehicle 602. In addition, the environment also shows vehicle 608 traveling toward the intersection and nearby vehicle 602.

GUI 620 further depicts additional information to assist a human operator understand the situation and provide assistance, including text instructions 630, visual path A 622 with path A information 624, and visual path B 626 with path B information 628. As such, GUI 620 can enable interface techniques that allow a human operator to provide situational-aware assistance to vehicle 602.

Visual path A 622 is shown as a trajectory that circumvents stranded vehicle 606 and realigns vehicle 602 according to the original path 610. As shown, visual path A 622 involves avoiding vehicle 608 that is predicted to travel through the intersection according to behavior prediction A 612. Vehicle 602 or the remote computing device may determine behavior prediction A 612 for vehicle 608 based on prior states of vehicle 608.

In addition to visual path A 622, GUI 620 also conveys path A information 624, which provides additional contextual information that the human operator could consider when providing assistance. In the example embodiment, path A information 624 indicates that vehicle 602 determined a 94 percent confidence level associated with performing path A and that performance of path A would require an estimated 15 minutes of additional travel to reach the destination. In other examples, path A information 624 can indicate other information for the human operator to review, such as an identification of particular maneuvers that are outside than typical maneuvers performed during autonomous navigation (e.g., U-turns).

Visual path B 626 is shown as a different trajectory that turns on the other street and avoids stranded vehicle 606. Because visual path B 626 would lead vehicle 602 down a different road that does not realign immediately with the original path 610, visual path B 626 may be easier for vehicle 602 to perform. As an example result, vehicle path B information 626 indicates a higher confidence level at 98 percent, but a longer time to reach the vehicle's destination (25 minutes).

GUI 620 further augments the environment representation with behavior prediction B 614 for vehicle 606. For instance, vehicle 602 may request for assistance after incorrectly predicting behavior prediction B 614 for vehicle 606 when vehicle 606 is actually stranded. As such, a human operator may suppress or modify behavior prediction B 614 when providing assistance to vehicle 602. Performing such an action may cause the computing device to generate and display new paths that depend on the action.

Figure 7:
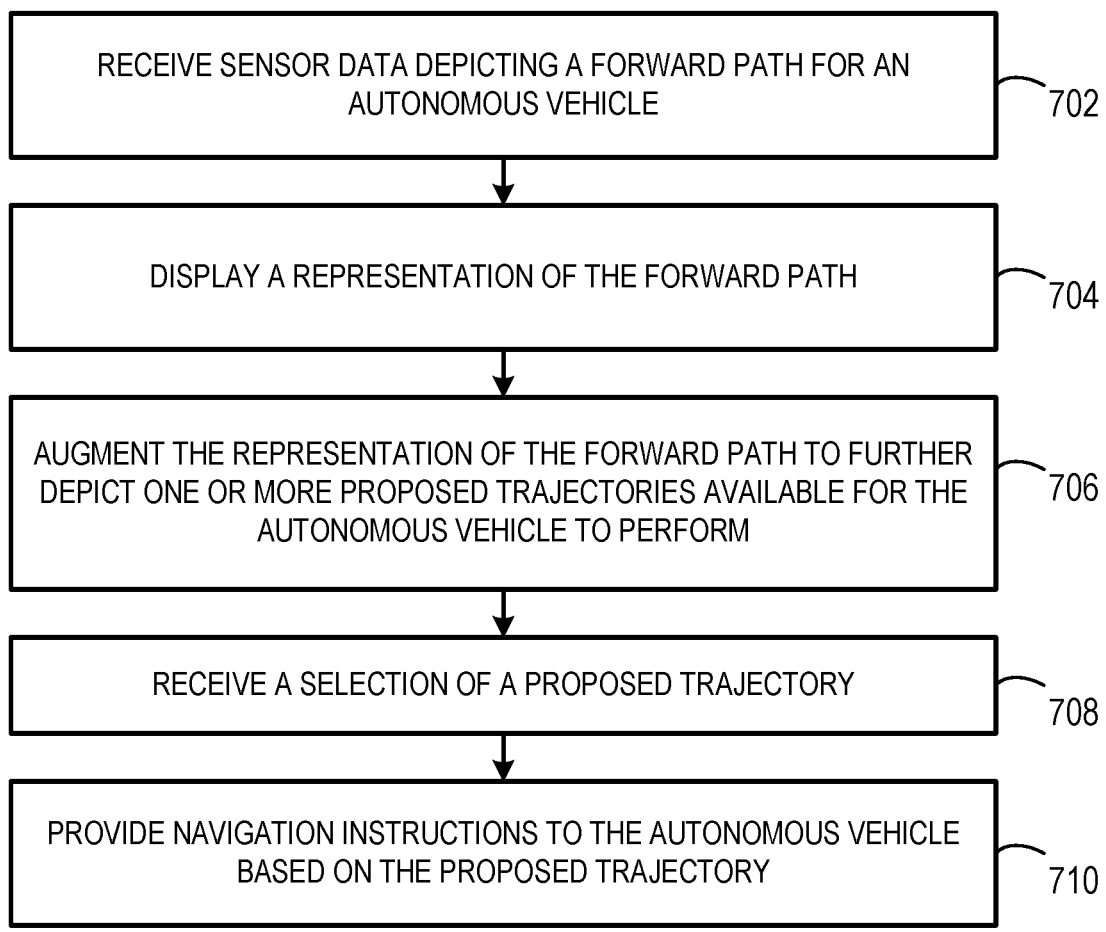
FIG. 7 is a flow chart of a method for enabling remote assistance, according to one or more example embodiments.

FIG. 7 is a flow chart of a method for vehicle occupancy confirmation, according to example implementations. Method 700 represents an example method that may include one or more operations, functions, or actions, as depicted by one or more of blocks 702, 704, 706, 708, and 710, each of which may be carried out by any of the systems, devices, and/or vehicles shown in FIGS. 1-6B, among other possible systems. For instance, system 400 depicted in FIG. 4 may enable execution of method 700.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves receiving sensor data depicting a forward path for an autonomous vehicle. The computing device is positioned remotely from the autonomous vehicle. In some examples, the computing device may receive a request for assistance from the autonomous vehicle that includes location information and the sensor data from one or more vehicle sensors on the autonomous vehicle. For instance, the computing device can receive sensor data depicting the forward path from a vehicle camera system on the autonomous vehicle.

At block 704, method 700 involves displaying, by the computing device, a representation of the forward path based on the sensor data.

At block 706, method 700 involves augmenting the representation of the forward path to further depict one or more proposed trajectories available for the autonomous vehicle to perform. Each proposed trajectory may convey one or more maneuvers positioned relative to road boundaries in the forward path. In some instances, the road boundaries can be permanent (e.g., lane markers, curbs) and/or temporary (e.g., traffic cones). In some examples, the computing device may display proposed trajectories using a color scale that represents differences in confidence levels associated with the proposed trajectories.

In some examples, the computing device may determine one or more proposed trajectories based on navigation information received from the autonomous vehicle. The computing device may determine one or more proposed trajectories based on prior driver information that conveys one or more successful trajectories navigating around an obstacle in the forward path via one or more driver-controlled vehicles.

In some examples, the computing device may receive one or more proposed trajectories and corresponding confidence levels from the autonomous vehicle where a confidence level for a proposed trajectory depends on respective maneuvers associated with performing the proposed trajectory. The computing device may then filter the one or more proposed trajectories to remove any proposed trajectories having a given confidence level below a threshold confidence level and augment the representation of the forward path to further depict the one or more proposed trajectories based on filtering the one or more proposed trajectories.

In some examples, the computing device may perform a comparison between the one or more proposed trajectories and determine an additional proposed trajectory based on the comparison. The computing device may then augment the representation of the forward path to further depict the additional proposed trajectory.

At block 708, method 700 involves receiving a selection of a proposed trajectory from the one or more proposed trajectories available for the autonomous vehicle to perform.

At block 710, method 700 involves providing, by the computing device and to the autonomous vehicle, navigation instructions based on the proposed trajectory.

In some examples, method 700 further involves receiving a plurality of behavior prediction trajectories and intents for one or more objects positioned relative to the forward path and augmenting the representation of the forward path to further convey respective behavior prediction trajectories and intents for the one or more objects. For instance, the computing device may display a first visual path for a first object based on a first behavior prediction trajectory and intent for the first object and display a second visual path for a second object based on a second behavior prediction trajectory and intent for the second object.

In some examples, the computing device may receive a first input that modifies the first visual path for the first object and subsequently provide navigation instructions further based on the first input that modifies the first visual path for the first object. For example, responsive to receiving the first input that modified the first visual path for the first object, the computing device may modify one or more proposed trajectories for the autonomous vehicle to perform and then display the representation of the forward path to further depict the one or more modified proposed trajectories available for the autonomous vehicle to perform. As such, the computing device may receive a given selection of a modified proposed trajectory available for the autonomous vehicle to perform.

In some examples, the computing device may receive a first behavior prediction trajectory for a first object positioned relative to the forward path and receive a second behavior prediction trajectory for a second object positioned relative to the forward path. The computing device may then augment the representation of the forward path to further convey the first behavior prediction trajectory for the first object and the second behavior prediction trajectory for the second object. For instance, the computing device may display a first visual path for the first object based on the first behavior prediction trajectory and a second visual path for the second object based on the second behavior prediction trajectory. The computing device may augment the representation to further depict a confidence level for each proposed trajectory available for the autonomous vehicle to perform.

In some cases, the computing device may receive a first input to suppress the first behavior prediction trajectory for the first object. Based on receiving the first input, the computing device may provide an indication to suppress the first behavior prediction trajectory for the first object to the vehicle and subsequently receive an updated proposed trajectory from the vehicle. The computing device may then augment the representation of the forward path to further depict the updated proposed trajectory.

In some examples, the computing device may receive the selection of the proposed trajectory from the one or more proposed trajectories available for the autonomous vehicle to perform and responsively perform a simulation that involves a virtual vehicle performing the proposed trajectory. The computing device may then provide the navigation instructions to the autonomous vehicle based on an outcome of the simulation exceeding a success threshold.

Figure 8:
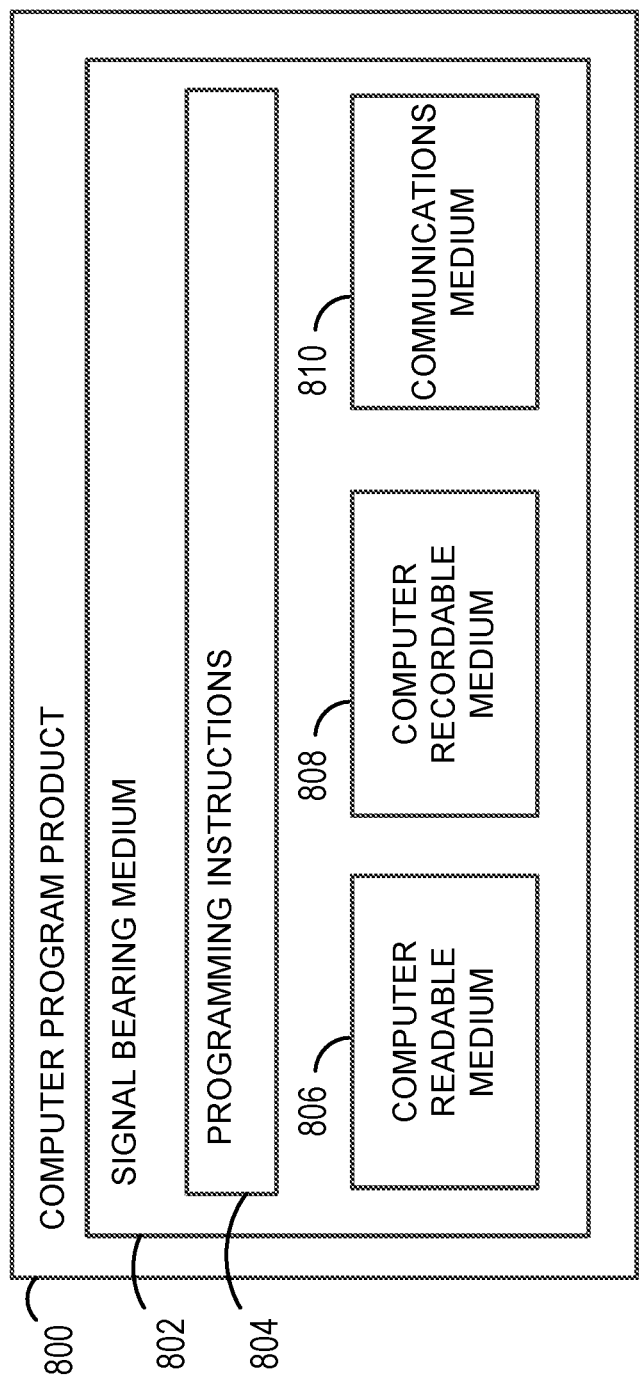
FIG. 8 is a schematic diagram of a computer program, according to one or more example embodiments.

FIG. 8 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 8, computer program product 800 is provided using signal bearing medium 802, which may include one or more programming instructions 804 that, when executed by one or more processors may provide functionality or portions of the functionality described above with respect to FIGS. 1-9.

Signal bearing medium 802 may encompass a non-transitory computer-readable medium 806, such as, but not limited to, a hard disk drive, a Compact Disc (CD), a Digital Video Disk (DVD), a digital tape, memory, components to store remotely (e.g., on the cloud) etc. In some implementations, signal bearing medium 802 may encompass computer recordable medium 808, such as, but not limited to, memory, read/write (R/W) CDs, R/W DVDs, etc.

In some implementations, signal bearing medium 802 may encompass communications medium 810, such as, but not limited to, a digital and/or an analog communication medium (e.g., a fiber optic cable, a waveguide, a wired communications link, a wireless communication link, etc.). Similarly, signal bearing medium 802 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 802 may be conveyed by a wireless form of communications medium 810.

One or more programming instructions 804 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 804 conveyed to the computer system by one or more of computer readable medium 806, computer recordable medium 808, and/or communications medium 810. The non-transitory computer readable medium could also be distributed among multiple data storage elements and/or cloud (e.g., remotely), which could be remotely located from each other. Computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, at a computing device, sensor data depicting a forward path for an autonomous vehicle, wherein the computing device is positioned remotely from the autonomous vehicle;
   identifying, based on the sensor data, an obstacle in the forward path of the autonomous vehicle;
   displaying, by the computing device, a representation of the forward path showing the obstacle identified based on the sensor data;
   determining one or more proposed trajectories for navigating around the obstacle based on one or more trajectories previously used by at least one vehicle to successfully navigate around the obstacle;
   based on prior driver information that conveys one or more successful trajectories navigating around an obstacle in the forward path via one or more driver-controlled vehicles
   augmenting the representation of the forward path to further depict one or more proposed trajectories available for the autonomous vehicle to perform, wherein each proposed trajectory conveys one or more maneuvers positioned relative to road boundaries in the forward path;
   receiving, at the computing device, a selection of a proposed trajectory from the one or more proposed trajectories available for the autonomous vehicle to perform; and
   providing, by the computing device and to the autonomous vehicle, navigation instructions based on the proposed trajectory.

2. The method of claim 1, wherein receiving sensor data depicting the forward path for the autonomous vehicle comprises:
   receiving a request for assistance from the autonomous vehicle, wherein the request for assistance includes location information and the sensor data from one or more vehicle sensors on the autonomous vehicle.

3. The method of claim 1, wherein receiving sensor data depicting the forward path for the autonomous vehicle comprises:
   receiving sensor data depicting the forward path from a vehicle camera system on the autonomous vehicle.

4. The method of claim 1, further comprising:
   receiving a plurality of behavior predictions for one or more objects positioned relative to the forward path; and
   augmenting the representation of the forward path to further convey respective behavior prediction trajectories for the one or more objects.

5. The method of claim 4, wherein augmenting the representation of the forward path to further convey respective behavior prediction trajectories and intents for the one or more objects comprises:
   displaying a first visual path for a first object based on a first behavior prediction trajectory for the first object; and
   displaying a second visual path for a second object based on a second behavior prediction trajectory for the second object.

6. The method of claim 5, further comprising:
   receiving a first input that modifies the first visual path for the first object; and
   wherein providing navigation instructions comprises:
   providing navigation instructions further based on the first input that modifies the first visual path for the first object.

7. The method of claim 6, further comprising:
   responsive to receiving the first input that modified the first visual path for the first object, modifying one or more proposed trajectories for the autonomous vehicle to perform;
   displaying the representation of the forward path to further depict the one or more modified proposed trajectories available for the autonomous vehicle to perform.

8. The method of claim 7, wherein receiving the selection of the proposed trajectory from the one or more proposed trajectories available for the autonomous vehicle to perform comprises:
   receiving a given selection of a modified proposed trajectory available for the autonomous vehicle to perform.

9. The method of claim 1, wherein augmenting the representation of the forward path to further depict one or more proposed trajectories available for the vehicle to perform comprises:
   displaying a plurality of proposed trajectories using a color scale, wherein the color scale represents differences in confidence levels associated with the plurality of proposed trajectories.

10. The method of claim 1, further comprising:
    determining one or more proposed trajectories based on navigation information received from the autonomous vehicle.

11. The method of claim 1, further comprising:
    determining one or more proposed trajectories further based on prior driver information that conveys one or more successful trajectories navigating around the obstacle in the forward path via one or more driver-controlled vehicles.

12. The method of claim 1, further comprising:
receiving one or more proposed trajectories and corresponding confidence levels from the autonomous vehicle, wherein a confidence level for a proposed trajectory depends on respective maneuvers associated with performing the proposed trajectory;
filtering the one or more proposed trajectories to remove any proposed trajectories having a given confidence level below a threshold confidence level; and
wherein augmenting the representation of the forward path to further depict one or more proposed trajectories available for the autonomous vehicle to perform comprises:
augmenting the representation of the forward path to further depict the one or more proposed trajectories based on filtering the one or more proposed trajectories.

13. The method of claim 1, further comprising:
performing a comparison between the one or more proposed trajectories;
determining an additional proposed trajectory based on the comparison; and
augmenting the representation of the forward path to further depict the additional proposed trajectory.

14. A system comprising:
an autonomous vehicle; and
a computing device positioned at a remote location relative to the autonomous vehicle and configured to:
receive sensor data depicting a forward path for an autonomous vehicle;
identify, based on the sensor data, an obstacle in the forward path of the autonomous vehicle:
display a representation of the forward path showing the obstacle identified based on the sensor data;
augment the representation of the forward path to further depict one or more proposed trajectories available for the autonomous vehicle to perform, wherein each proposed trajectory conveys one or more maneuvers positioned relative to road boundaries in the forward path;
receive a selection of a proposed trajectory from the one or more proposed trajectories available for the autonomous vehicle to perform; and
provide, to the autonomous vehicle, navigation instructions based on the proposed trajectory.

15. The system of claim 14, wherein the computing device is further configured to:
receive a first behavior prediction trajectory for a first object positioned relative to the forward path;
receive a second behavior prediction trajectory for a second object positioned relative to the forward path; and
augment the representation of the forward path to further convey the first behavior prediction trajectory for the first object and the second behavior prediction trajectory for the second object.

16. The system of claim 15, wherein the computing device is further configured to:
display a first visual path for the first object based on the first behavior prediction trajectory and a second visual path for the second object based on the second behavior prediction trajectory.

17. The system of claim 16, wherein the computing device is further configured to:
receive a first input to suppress the first behavior prediction trajectory for the first object;
based on receiving the first input, provide, to the autonomous vehicle, an indication to suppress the first behavior prediction trajectory for the first object;
receive, from the autonomous vehicle, an updated proposed trajectory; and
augment the representation of the forward path to further depict the updated proposed trajectory.

18. The system of claim 16, wherein the computing device is further configured to:
augment the representation of the forward path to further depict a confidence level for each proposed trajectory available for the autonomous vehicle to perform.

19. The system of claim 18, wherein the computing device is further configured to:
based on receiving the selection of the proposed trajectory from the one or more proposed trajectories available for the autonomous vehicle to perform, perform a simulation that involves a virtual vehicle performing the proposed trajectory;
based on an outcome of the simulation exceeding a success threshold, provide the navigation instructions to the autonomous vehicle.

20. A non-transitory computer-readable medium configured to store instructions, that when executed by a computing system comprising one or more processors, causes the computing system to perform operations comprising:
receiving sensor data depicting a forward path for an autonomous vehicle;
identifying, based on the sensor data, an obstacle in the forward path of the autonomous vehicle;
displaying a representation of the forward path showing the obstacle identified based on the sensor data;
determining one or more proposed trajectories for navigating around the obstacle based on one or more trajectories previously used by at least one vehicle to successfully navigate around the obstacle;
augmenting the representation of the forward path to further depict one or more proposed trajectories available for the autonomous vehicle to perform, wherein each proposed trajectory conveys one or more maneuvers positioned relative to road boundaries in the forward path;
receiving a selection of a proposed trajectory from the one or more proposed trajectories available for the autonomous vehicle to perform; and
providing, to the autonomous vehicle, navigation instructions based on the proposed trajectory.

* * * * *